United States Patent
Kong et al.

(10) Patent No.: US 7,197,669 B2
(45) Date of Patent: Mar. 27, 2007

(54) METHOD AND CIRCUIT FOR COMMAND INTEGRITY CHECKING (CIC) IN A GRAPHICS CONTROLLER

(75) Inventors: Dehai Kong, Sunnyvale, CA (US); Chih-Yiieh Cheng, San Jose, CA (US)

(73) Assignee: VIA Technologies, Inc., Hsin-Tien Taipei (TW)

( * ) Notice: Subject to any disclaimer, the term of this patent is extended or adjusted under 35 U.S.C. 154(b) by 496 days.

(21) Appl. No.: 10/631,336

(22) Filed: Jul. 30, 2003

(65) Prior Publication Data

US 2005/0028047 A1 Feb. 3, 2005

(51) Int. Cl.
*G06F 11/00* (2006.01)

(52) U.S. Cl. .................. 714/39; 714/40; 714/43; 714/49; 345/522

(58) Field of Classification Search .............. 714/40, 714/44, 49
See application file for complete search history.

(56) References Cited

U.S. PATENT DOCUMENTS

| | | | | |
|---|---|---|---|---|
| 4,573,152 | A * | 2/1986 | Greene et al. ............ | 714/44 |
| 5,432,900 | A * | 7/1995 | Rhodes et al. ........... | 715/500.1 |
| 5,754,750 | A * | 5/1998 | Butterfield et al. ....... | 345/418 |
| 5,812,760 | A * | 9/1998 | Mendenhall et al. ...... | 714/49 |
| 5,875,295 | A | 2/1999 | Devic ....................... | 395/185.05 |
| 5,990,914 | A * | 11/1999 | Horan et al. .............. | 345/531 |
| 6,041,406 | A * | 3/2000 | Mann ........................ | 712/227 |
| 6,173,422 | B1 * | 1/2001 | Kimura et al. ............ | 714/57 |
| 6,496,900 | B1 * | 12/2002 | McDonald et al. ........ | 711/112 |
| 6,629,184 | B1 * | 9/2003 | Berg et al. ................ | 710/306 |
| 6,675,345 | B1 * | 1/2004 | Brown et al. ............. | 714/763 |
| 6,829,729 | B2 * | 12/2004 | Hicks et al. .............. | 714/30 |

FOREIGN PATENT DOCUMENTS

JP         404287243      * 10/1992

* cited by examiner

*Primary Examiner*—Scott Baderman
*Assistant Examiner*—Joshua Lohn
(74) *Attorney, Agent, or Firm*—Thomas, Kayden, Horstemeyer & Risley (57) ABSTRACT

A fault tolerant graphics controller that generates error codes for graphics commands and checks the error codes before the graphics controller executes the command. The error code generator may be configured to detect and correct errors or to just detect errors. If an error is detected or an uncorrectable error occurs, the host computing system can be informed or interrupted, the erroneous command can be flushed from the graphics controller or the commands before and after the possibly erroneous command can be stored to help determine the erroneous command. Error codes can be generated on a block basis and stored in the frame buffer, thereby having minimal impact on system performance.

23 Claims, 7 Drawing Sheets

METHOD AND CIRCUIT FOR COMMAND INTEGRITY CHECKING (CIC) IN A GRAPHICS CONTROLLER

FIELD OF THE INVENTION

The present invention relates to the field of image processing. More particularly, the present invention relates to a method and system for checking the integrity of a command within a graphics controller.

BACKGROUND OF THE INVENTION

As graphics applications have increased in complexity and realism, the capabilities of host platforms (including processor speeds, system memory capacity and bandwidth, and multiprocessing) are also continually increasing. To meet the demands of modern graphics, graphics controllers, sometimes also called graphics accelerators, have become an integral component in present day computer systems. In the present disclosure, the term graphics controller refers to either a graphics controller or graphics accelerator. In computer systems, graphics controllers control the display subsystem of a computer such as a personal computer, workstation, personal digital assistant (PDA), or any kind of equipment with a display monitor.

When only display pixel data was processed in a graphics controller, the occurrence of an error in the graphics display did not stop the computer system from operating. With increased demands on the display subsystem, graphics controllers now process graphics commands and errors in these commands can affect more than just the display of graphics. Because prior art graphics controllers have treated commands the same as data, these graphic controllers do not have fault tolerant capability with regard to errors in graphics commands. That is, the conventional graphics controller does not correct the errors in the digital commands it receives. In a typical command error situation, a computer system display may operate erratically, and, in a worse case situation, the entire computer system may fail, thus necessitating a reboot of the system. Additionally, because prior art graphics controllers do not provide for error detection or correction they cannot provide any diagnostic information to the host computer system.

Commonly a graphics controller includes a memory for use as a frame buffer for the display. This frame buffer memory is somewhat prone to error, especially when implemented with dynamic random access memory (DRAM).

Moreover, with the advent of high speed data transfer rates, for example, data rates over 500 mega-transfers per second (MT/sec) between a chip and an external DRAM, errors can be much more common. Errors can be caused from timing, voltage and noise problems. Moreover, simply moving a pad or wire on an integrated circuit (IC) design can sometimes dramatically increase the occurrence of errors. Thus, prior art graphics controllers are not fault tolerant. Moreover, any error occurring anywhere within a command transfer flow (e.g., in a first-in-first-out (FIFO) device, DRAM, high speed printed circuit board pad or trace, etc.) can cause the computer system to fail. In such a situation, a graphics controller, computer system or operating system does not have information that an error has occurred and further does not have a manner for detecting that an error has occurred within the graphics controller. Without knowledge of an error and further, without knowledge of where an error occurred, the computer system can, of course, not take corrective action. In prior art computer systems, an error within a graphics controller can be such that the entire computer system fails without possibility of recovery. The only real manner of correcting such an error may be to reset or reboot the host computer system.

Thus, it would be desirable to have an improved graphics controller that can tolerate errors in its commands.

SUMMARY OF THE INVENTION

The present invention is directed to an improved graphics controller. An apparatus, in one embodiment of the present invention, is a fault tolerant graphics controller that includes an error code generator, a frame buffer, an error code decoder and a graphics controller. The error code generator receives graphics command codes and is configured to generate an error code for each graphics command code received. The frame buffer is configured to store graphics data and graphics commands, including the error codes generated by the error code generator. The error code decoder is connected between the frame buffer and the graphics controller and configured to determine from a command code and its associated error code whether or not there is an error in the command code and to provide an indication thereof and the graphics controller is configured to execute the graphics command codes to display the graphics data.

The apparatus further includes an interrupt and status controller for interrupting or sending status a host computer system when an error is detected or when an uncorrectable error is detected.

The apparatus further includes a flush controller for flushing graphics commands from the graphics controller when an error is detected or when an uncorrectable error is detected. The flush controller may also flush any data determined to be associated with the graphics commands that are flushed.

The apparatus further includes a store-commands controller for storing commands before and after the command having an error or having an uncorrectable error.

The error code generator has the capability of receiving a group of graphics commands and forming an error code for the group. The size of the group error code is the same as the size of any command in the group, thereby permitting convenient packing of the commands with the error codes.

In one embodiment the error code generator and error code decoder are an integrated circuits. In other embodiments, they are implemented in software.

One advantage of the fault tolerant graphics controller of the present invention is that errors in the graphics system can be analyzed by the host computer system to determine if the graphics system or the frame buffer needs replacing.

Another advantage of the fault tolerant graphics controller is that a graphics command having an error can by resent to the graphics controller.

Yet another advantage is that an error can be detected in a graphics command before the command is executed thereby preventing a system error caused by executing an erroneous command.

BRIEF DESCRIPTION OF THE DRAWINGS

These and other features, aspects and advantages of the present invention will become better understood with regard to the following description, appended claims, and accompanying drawings where:

DETAILED DESCRIPTION OF THE PREFERRED EMBODIMENTS

Figure 1:
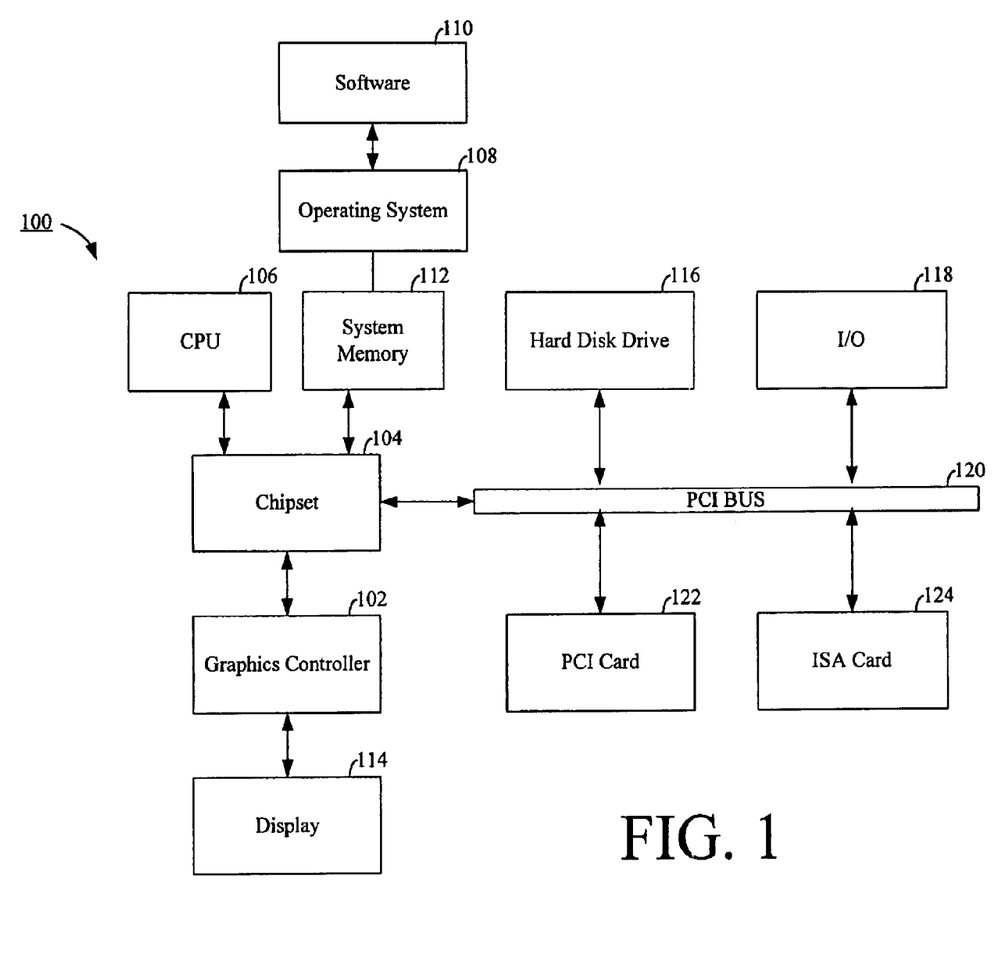
FIG. 1 shows a block diagram of a computer system with a graphics controller according to an embodiment of the invention.

FIG. 1 shows a block diagram of a computer system 100 with a graphics controller 102 according to an embodiment of the invention. Computer system 100 includes a central processing unit (CPU) 106, a system memory 112, a chipset 104, a graphics controller 102, a display device 114, a bus 120, a hard disk drive 116, an I/O device 118, a PCI controller 122 and an ISA controller 124.

The CPU 106 includes, among other things, a microprocessor and supporting circuitry. Such processors as the Pentium II®, Pentium III®, or Pentium IV® from Intel are typical microprocessors in the computer system. The present invention, however, is not limited to these microprocessors.

The chipset 104 is connected to the CPU 116 and the system memory 112, the graphics controller 102 and the bus 120 so that it can communicate with the various devices connected to the bus 120. In version of the computer system, the bus 120 is a PCI bus. The chipset 104 can be implemented as a group of microchips designed to work as a unit in performing one or more related computational functions. Commonly, chipset 104 is an Intel 430HX PCI set when the processor is an Intel Pentium® microprocessor. The Intel chipset is a two-chip set that provides a PCI bus controller and includes support for a Universal Serial Bus (USB) interface.

Chipset 104 typically includes two components, a northbridge component and a southbridge component. The northbridge component communicates with CPU 106 over a Front Side Bus (FSB) and acts as the controller for system memory 112, the PCI bus 120 and an Advanced Graphics Port (AGP) (not shown). The type of FSB, memory 112 and AGP varies from manufacturer to manufacturer of northbridges. Some northbridges integrate video as well.

The southbridge component handles most basic forms of I/O interfaces, such as USB, serial ports, audio interfaces, and the IDE drive interface. The type of I/O interface that is controlled depends on the particular southbridge component in use. The southbridge component connects to the northbridge's PCI bus 120, which, for computer system 100, is a 32-bit, 33 MHz bus capable of providing 133 Mbytes per second of bandwidth. Accordingly, the bidirectional communication between chipset 104 and PCI bus 120 includes bidirectional communication between the northbridge and southbridge components of chipset 104 as well as bidirectional information from the chipset 104 to other peripherals such as hard disk drive 116 or PCI card 122. VIA Technologies as well as most current Intel and AMD chipsets use this type of northbridge/southbridge architecture.

Computer system 100 includes operating system 108, resident in system memory, which is a software platform for other software 110, such as graphics software. In the present invention, software 110 is a program that generates graphics data and graphics commands to be processed by the graphics controller 102. Such graphics data and graphics commands may be processed by other components of computer system 100 including chipset 104, CPU 106, through system memory 112. In the present invention, software 110 can further include supplementary processing of graphics data and graphics commands as will be described further below.

CPU 106 and chipset 104 as well as other devices within computer system 100 are communicatively coupled to system memory 112, where system memory 112 is implemented with various types of integrated circuit memory such as static random access memory (SRAM), dynamic random access memory (DRAM), or cache memory. Though system memory 112 may be further accessible by the graphics controller 102, local memory within the graphics controller is preferred for storing graphics data or graphics commands, because the graphics controller can access the local memory more quickly. Graphics controller 102 is described below in more detail.

Within computer system 100, the PCI bus 120 is an interconnection system, in which expansion slots can be closely spaced for high speed operation, between microprocessor 106 via chipset 104 and attached devices. Using PCI 120, a computer system 100 can support both PCI cards 122 and the older Industry Standard Architecture (ISA) expansion cards 124. The PCI bus 120 transmits 32 bits at a time over a 124-pin bus or (the extra pins are for power supply and grounding)64 bits over a 188-pin bus in an expanded configuration. PCI 120 multiplexes address and data signals, sending the address on one clock cycle and data on the next. Burst data transfers can be sent starting with an address on the first cycle and a sequence of data transmissions on a certain number of successive cycles.

The PCI specification defines two different card lengths. A full-size PCI form factor is 312 millimeters long; short PCI cards range from 119 to 167 millimeters in length to fit into smaller slots where space is an issue. Like full-size PCI cards, short PCI cards are high-performance I/O bus cards that can be configured dynamically for use in devices with high bandwidth requirements. Most current PCI cards 122 are half-sized or smaller. There are a number of variations of PCI, including CompactPCI, Mini PCI, Low-Profile PCI, concurrent PCI, and PCI-X all of which are applicable to computer system 100 of the present invention. I/O devices 118 include, but are not limited to, input devices such as a keyboard, mouse, touch screen, or other input device as well as output devices such as a screen, printer, speaker, or other output device.

Graphics controller 102 is included to provide fast and efficient rendering of graphical information on a display 114. Graphics controller 102 typically has its own processor and specialized hardware for fast and efficient rendering of graphics. The software program 110 can be executed either by the CPU 106 or by the processor resident on the graphics controller 102.

The graphics controller 102 is a computer microelectronics component to which software 110 can offload the sending and refreshing of images to display 114 and the computation of special effects common to two-dimensional (2-D) and three-dimensional (3-D) images. Graphics controller 102 accelerates the rendering of images on display 114 thus making it possible to achieve effects not otherwise possible using the CPU 106 alone. For example, the presentation of very large images or of interactive games in which images need to changed quickly in response to user input is greatly facilitated by graphics controller 102. In an embodiment of the invention, the functionality of a graphics controller 102 is extended further by equipping computer system 100 with an Accelerated Graphics Port (AGP) which is a bus (or data path) interface between computer components involved in image display. In an embodiment of the invention, graphics controller 102 provides an Application Program Interface (API). In another embodiment of the invention, graphics controller 102 supports more than one API. Available APIs include OpenGL and Microsoft Corporation's DirectX and Direct3D.

While graphics controller 102 of the present invention includes much of the functionality of prior art graphics controllers, graphics controller 102 further provides for command integrity checking. Command integrity checking involves analyzing a digital graphics command to determine whether the digital command contains errors. Where errors are detected, another embodiment of the invention provides for correcting such errors. Where digital commands cannot be corrected, still another embodiment of the invention provides a mechanism for computer system 100 to recognize that an error has occurred. Before describing the functionality of graphics controller 102 of the present invention, it is first useful to understand certain aspects of prior art graphics controllers.

Figure 2A:
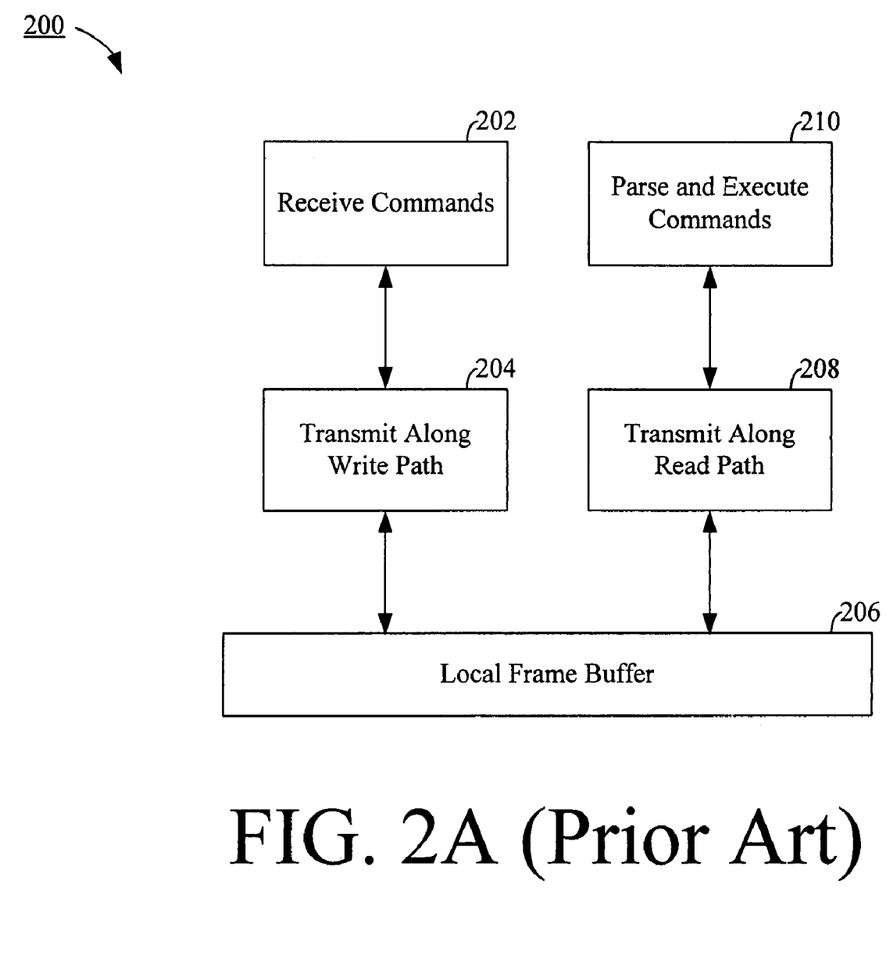
FIG. 2A is block diagram of a command transfer flow in a graphics controller according to the prior art.

FIG. 2A shows a block diagram 200 of a command transfer flow in a graphics controller according to the prior art. Block 202 receives incoming commands for the prior art graphics controller. These commands are then transmitted along a command write path, represented by block 204, and ultimately arrive in a local frame buffer 206. Part of the graphics controller command transfer flow includes a command overflow buffer (COB). The COB receives a command stream from a system bus interface, and places the commands into a local frame buffer 206. The information is then read back at a later time.

In prior art systems, commands are 256 bits in length. The command write path 204 represents the physical path that a digital graphics command traverses to reach the local frame buffer 206. The command write path 204 includes, for example, paths within integrated circuits, contact pads, and paths along printed circuit boards and along cables. The local frame buffer 206 is typically implemented using fast access memory such as dynamic random access memory (DRAM).

According to the prior art, once in local frame buffer 206, a command then needs to be transmitted along a read path at block 208. In an manner similar to the command write path, a command read path includes, for example, paths within integrated circuits, contact pads, paths along printed circuit boards and along cables. According to the prior art, the commands are then parsed and executed at block 210. A command is first parsed to determine its contents and then executed in an appropriate manner within a prior art graphics controller.

Figure 2B:
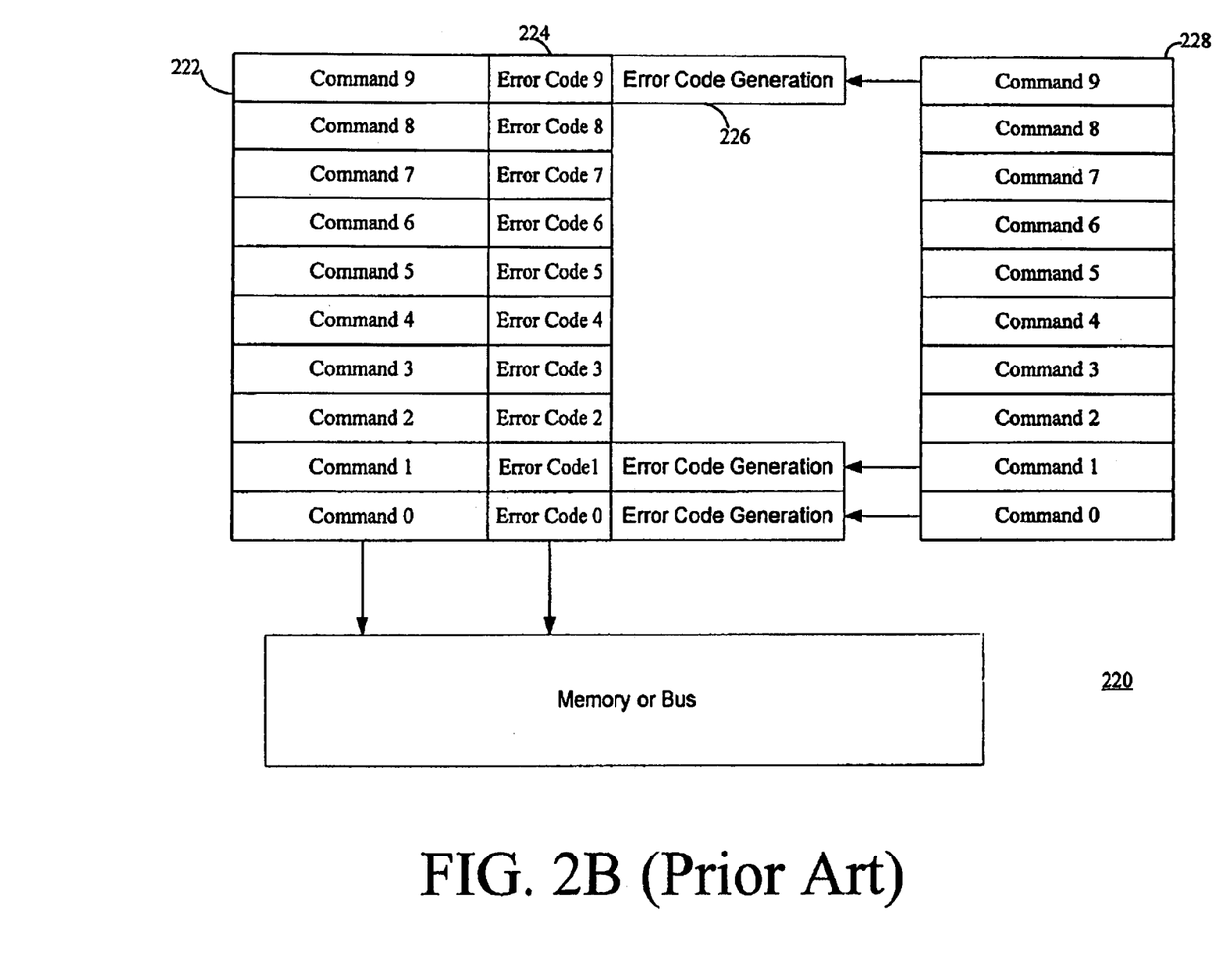
FIG. 2B shows a block diagram of a conventional coupled command and error code encoding scheme.

FIG. 2B shows a block diagram of a conventional coupled command and error code encoding system 220. As illustrated, the conventional scheme causes the commands 228 to become wider commands 222 because of the addition of error codes 224 generated by error code generator 226. This causes the commands to be incompatible with datapaths present in the graphics controller.

As explained previously, prior art graphics controllers are not tolerant to errors that may occur within the digital representation of a graphics command. In contrast, the present invention provides a fault tolerant graphics controller 102 by implementing error detection or correction.

Figure 3:
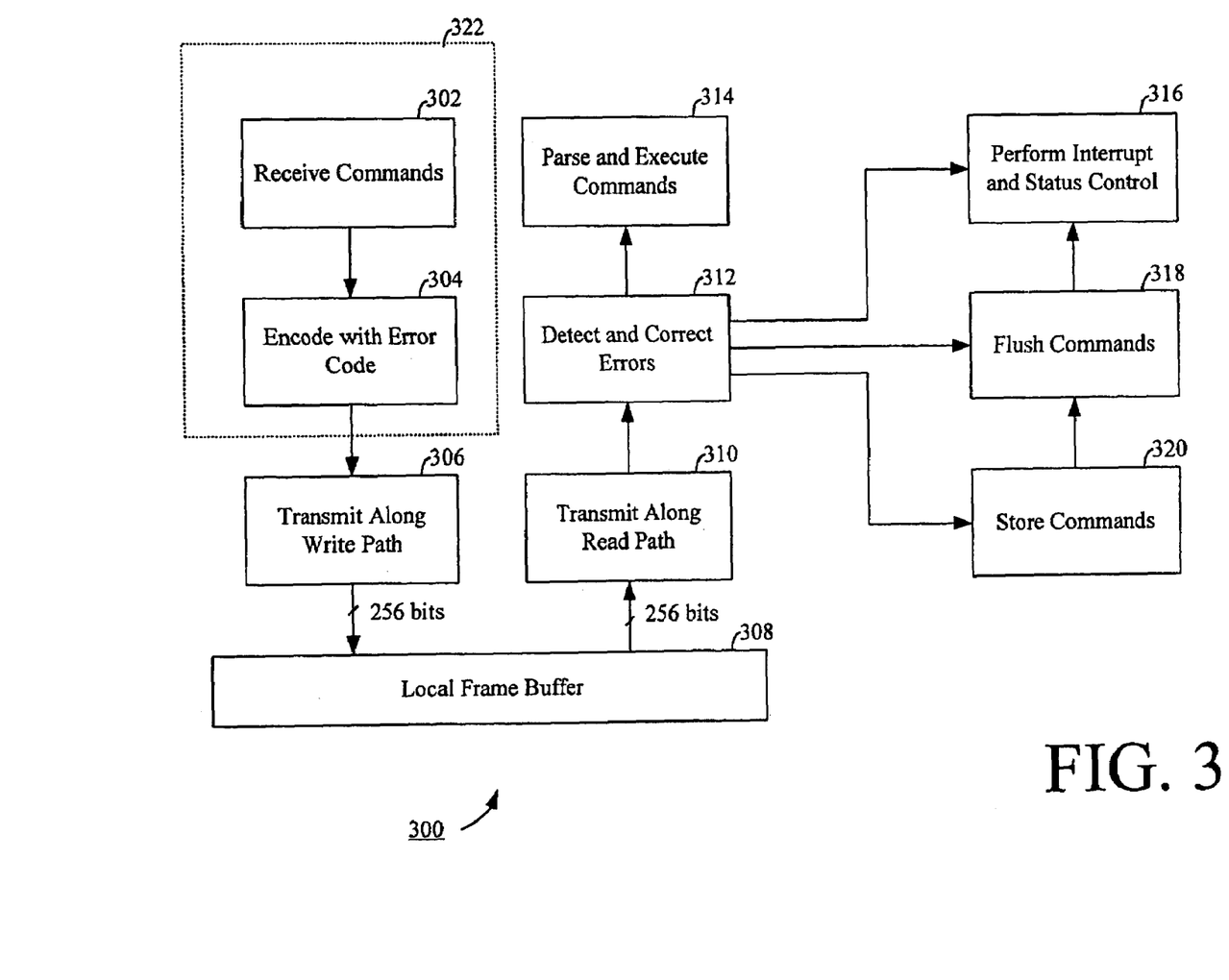
FIG. 3 is block diagram of a command transfer flow in a graphics controller according to an embodiment of the present invention.

FIG. 3 shows a block diagram 300 of a command transfer flow in a graphics controller 102 in accordance with an embodiment of the present invention. Incoming commands are received at block 302 and are encoded in block 304 with an error code that allows for the detection or correction of errors that may affect a digital graphics command. According to an embodiment of the invention, commands and error codes are 256 bits in length. As will be discussed further below, groups of error codes for eight commands are collected in an error code of 256 bits in length. In an embodiment of the invention, encoding is performed within software 210. Software implementation allows for fast implementation and flexibility in changing, adjusting or updating an error code encoding scheme. In another embodiment of the invention, encoding is achieved in specialized firmware or hardware within block 302. A hardware implementation provides increased speed performance because integrated circuits (ICs), application specific integrated circuits (ASICS), and other hardware implementations allow for efficient and fast encoding.

The digital commands, upon being encoded with an error code at block 304, are then transmitted along a command write path, represented by block 306, and stored in the local frame buffer 308. The command write path 306 is similar to the command write path described in reference to FIG. 2 and represents the physical path that a digital graphics command traverses to reach the local frame buffer 308. Importantly, the present invention allows for any data paths or data bus widths to remain the same thus saving time and cost in implementation. In fact, when implemented in this manner, the present invention can be made effectively transparent to original equipment manufacturers (OEMs) and end users. A command write path can include, for example, paths within integrated circuits, contact pads, paths along printed circuit boards and along cables. The local frame buffer 308 is similar to local frame buffer 206 and includes, for example, fast access memory such as DRAM typically used in graphics applications. Once at local frame buffer 308, a command is subsequently transmitted along a read path represented by block 310. In a manner similar to that discussed regarding FIG. 2, a digital command must pass through a read path that can include, for example, paths within integrated circuits, through contact pads, along printed circuit boards and along cables.

According to the present invention, digital commands which have been encoded at block 304 are then decoded at block 312. Any errors within the decoded commands are also detected and corrected at block 312. If a command contains no errors, either because no errors were present or because any errors have been corrected, such commands are then passed to block 314 where they are first parsed and then executed to render a graphical image on display 114 of FIG. 1.

The present invention further provides the functionality represented by interrupt and status block 316, flush command block 318 and store commands block 320. When an error is detected in a command and the error cannot be corrected, block 316 performs an interrupt and status control operation. Depending on the nature of the affected command, the operation of graphics controller 102 of the present invention is interrupted to prevent computer system 100 from failing. Further, depending on the nature of the affected command, the operation of the entire computer system 100 may be interrupted. In an embodiment of the invention, interrupt and status block 316 includes analysis of the affected command to determine whether or not the graphics controller 102 or computer system 100 should be interrupted. Alternatively, status information is collected by interrupt and status block 316, and the status is then sent to the graphics controller 102 or computer system 100 for further processing. Status information includes information with regard to the frequency or pattern of any detected errors. Additionally, status includes diagnostic information about graphics controller 102. Such diagnostic information can then be processed by graphics controller 102 or computer system 100 to reduce the occurrence of errors.

When an error is detected in a command and the command cannot be corrected or when errors are only detected, the flush commands block 318 provides the mechanism to flush the erroneous commands from the graphics controller. With regard to the functionality of block 318, it is important to note that commands may have associated data that also needs to be processed by graphics controller 102. In a situation where commands are flushed at block 318, an embodiment of the invention also flushes any associated data to the extent that such data can be determined.

Where an error is detected in a command and the error cannot be corrected, an embodiment of the invention provides the functionality of block 320 by which commands occurring before and after an error are stored. In an embodiment of the invention, incoming commands are passed through a shift register of predetermined length such that when an error occurs, commands that were received before the error have been stored and can be retrieved. Moreover, commands received after the error can also be stored. This information can then be passed to graphics controller 102 or computer system 100 to help determine the erroneous command. The pattern of commands before and after the error can be matched with a log of commands to thereby determine the command with the error. In an embodiment of the invention, the command with the error is then retransmitted. In another embodiment of the invention, a series of commands before or after the command with the error are retransmitted.

According to the present invention, an error correction code (ECC) or an error checking and correcting (also called ECC) code allows command information that is being read or transmitted to be checked for errors and, when necessary, corrected prior to execution. ECC differs from parity-checking or other error detection schemes in that errors are not only detected, but also corrected. In an embodiment of the present invention, ECC is implemented to improve the performance of graphics controller 102. In another embodiment of the invention, only an error detection code is implemented. An error detection code provides advantages over the prior art by providing information that an error has occurred. In this embodiment, variations of the functions of interrupt and status control block 316, the flush commands block 318 and the store commands block 320 are provided. For example, interrupt and status control block 316 is based solely on the detection of errors. Because errors cannot be corrected, any commands with detected errors are flushed by flush commands block 318. Commands before and after the command with the error can also be stored as shown at block 320 for use by graphics controller 102 or computer system 100.

A general ECC will now be described, however, one of skill in the art will understand that other ECCs may be implemented without departing from the present invention. When a unit of information (e.g. a word) is transmitted along a command write path or command read path, or held within local frame buffer 308, a code that describes the bit sequence in the word is calculated and stored along with the unit of information. In an embodiment of the invention, for each 256 bits, an extra 32 bits, one bit for each eight bits, are needed for the ECC. When the unit of information is requested for reading, a code for the unit of information is again calculated using the original ECC algorithm. The newly generated code is then compared with the code generated when the information was stored. If the codes match, the information is free of errors and can be handled as normal. If the codes do not match, the missing or erroneous bits are determined through the code comparison and the bit or bits are supplied or corrected.

In certain situations, the code is not sufficient to correct all errors and the original information cannot be recovered. Any error that is recurrent may be indicative of a hardware failure, and random errors may be the consequence of a near peak performing computer system 100 or graphics controller 102. At the 256-bit level, parity-checking and ECC both require the same number of extra bits. In general, ECC increases the reliability of computer system 100 and, in particular, graphics controller 102 of the present invention. Hamming codes are commonly implemented. In general such codes are able to detect and restore lost or erased bits as well as incorrect bits.

Figure 4:
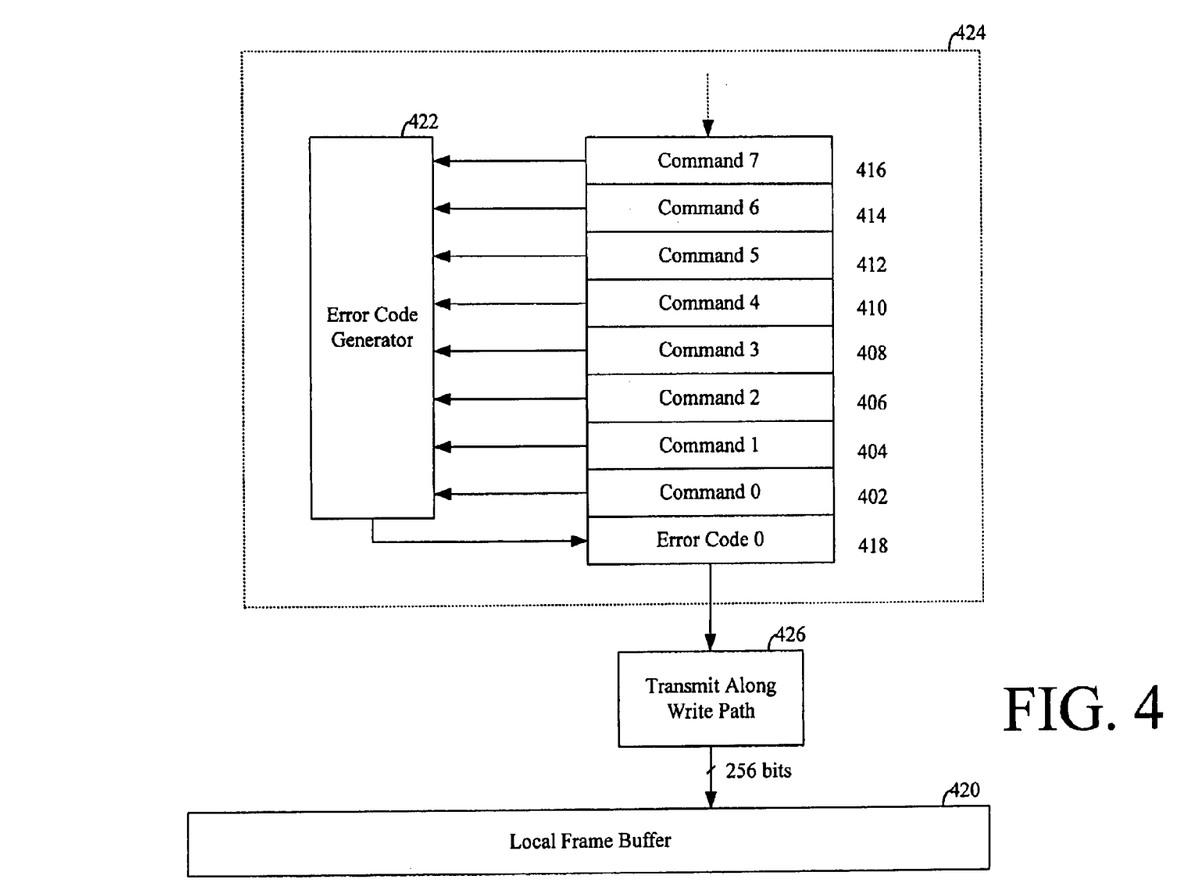
FIG. 4 is a block diagram depicting a stream of incoming commands that are encoded as a block according to an embodiment of the present invention.

In an embodiment of the invention, graphics controller 102 is made compatible with prior art systems by implementing a block ECC scheme shown in FIG. 4. In FIG. 4, each command 402–416 in a stream of incoming commands, each 256 bits in length, has an ECC code generated by error code generator 422, where an error code is 32 bits in length. In the embodiment shown in FIG. 4, eight commands 402 through 416 are collected as a block and each command's error code is collected to form part of a 256-bit error code 418 with the most significant 32 bits of error code 418 associated with command 402, the least significant 32 bits associated with command 416, and the intervening sets of 32 code bits being appropriately associated with the intervening commands.

Read and write pointers are included within error code 418 to provide demarcation of error codes associated with commands 402 through 416. Because commands 402–416 and error code 418 are 256 bits long, the commands 402–416 and error code 418 can be transmitted on the same 256-bit interface used by the prior art without need for modification. This feature provides the aforementioned effective transparency to OEMs and end users. Because only nine 256-bit pieces of information are required, the additional 256-bit error code does not significantly degrade the performance of the system. Error codes for further blocks of eight commands are similarly generated. FIG. 4 shows the write path to the local frame buffer 420; reading from local frame buffer 420 is performed in a corresponding manner through a 256-bit interface for commands 402–416 and error code 418. Although there is some effect on the throughput, the integrity of commands is improved such that the performance of graphics controller 302 and in turn computer system 300 is greatly increased.

Whereas the present invention is useful when applied to graphics commands, it is further useful when applied to graphics data in another embodiment of the invention. Although errors in graphics data may not be detrimental to the operation of computer system 300 or graphics controller 302, improved integrity of processed data further improves the operation of both computer system 300 and graphics controller 302.

Figure 5:
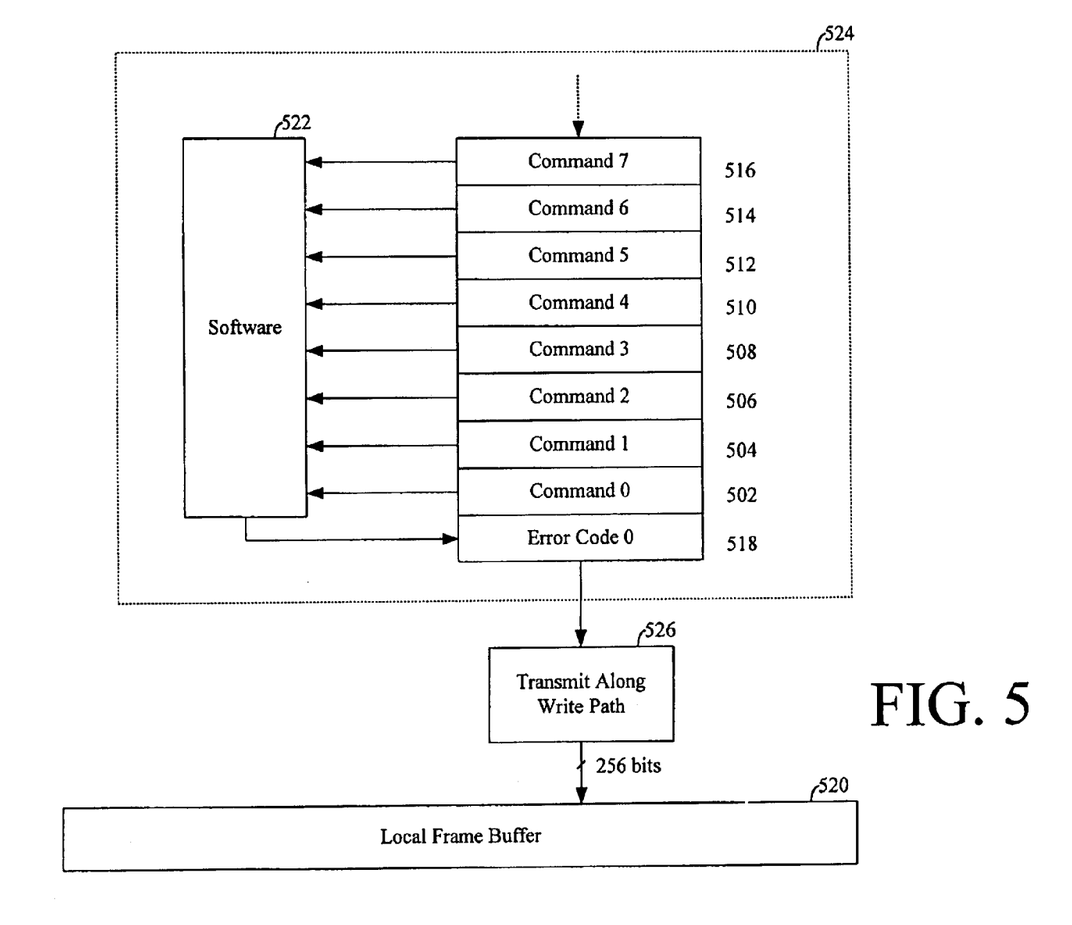
FIG. 5 is a block diagram depicting a stream of incoming commands that are encoded as a block according to another embodiment of the present invention.

Although the present invention has been described in considerable detail with reference to certain preferred versions thereof, other versions are possible. For example, FIG. 5 is a block diagram depicting a stream of incoming commands that are encoded as a block by software rather than by the hardware shown in FIG. 4. In the software encoding method, shown in FIG. 6, an array, pack_cmd[ ] contains the commands and check_code[ ] contains the check codes. The encoding is performed by the hamming_encode_fun( ) function, which operates on a command. There is one check code for an array of eight pack commands, as the index variable takes on value from 0 to 7.

Figure 6:
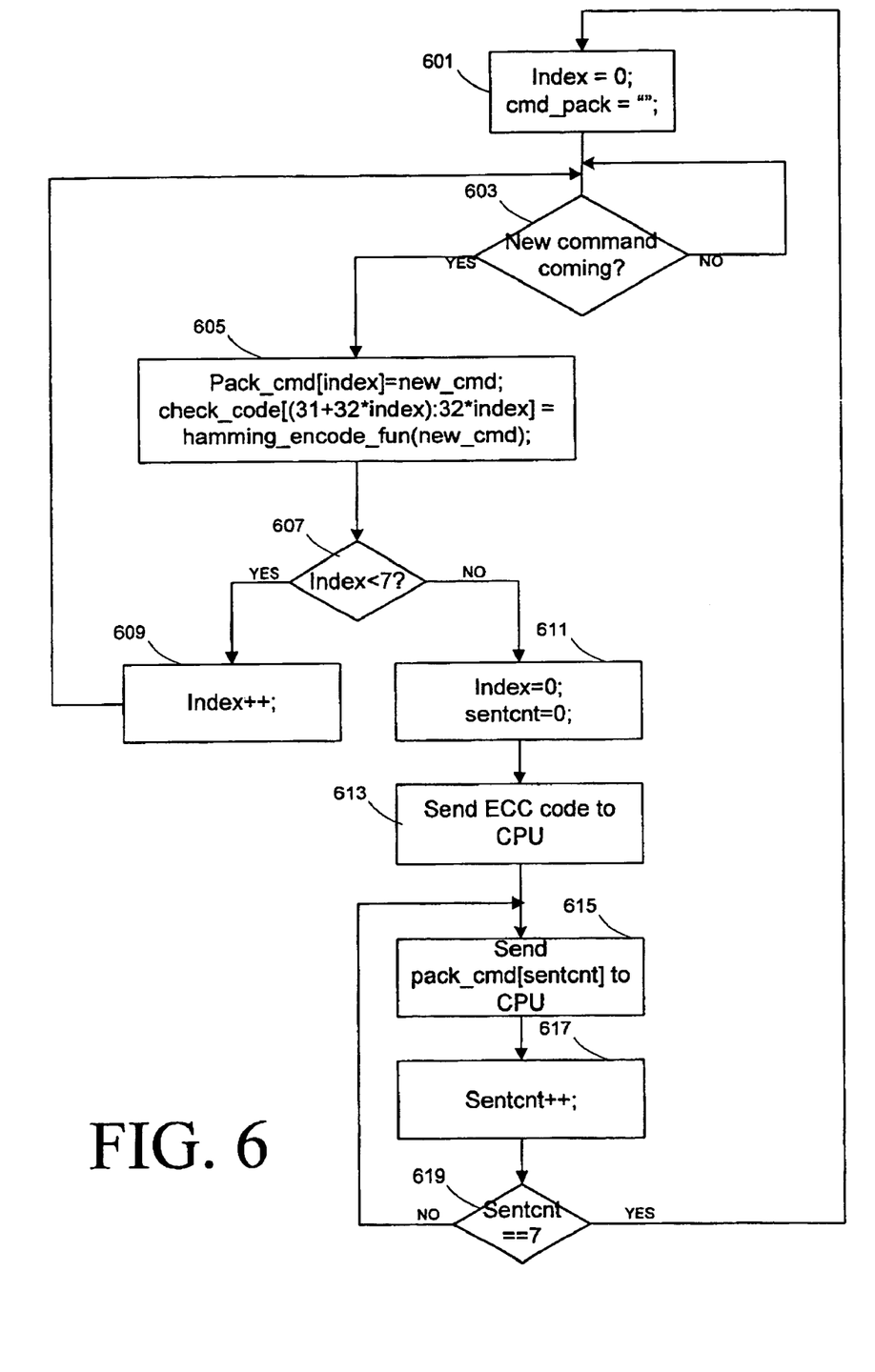
FIG. 6 shows a flow chart of a software method of encoding graphics command codes in accordance with an embodiment of the present invention.

In step 601, the index variable is set to zero and the pack_cmd[ ] array is initialized. When a new command is received, as determined in step 603, the command, new_cmd, is entered into the pack_cmd[ ] array, in step 605, and a portion of the check code is computed by the function hamming_encode_fun(new_cmd) and entered into the proper position in the check_code array by computing the index of the check_code array as (31+32*index):32*index, also in step 605. Next, in step 607, the index is tested to determine whether it is less than 7. If so, the index is incremented in step 609, the next command is put into the pack_cmd array and the next part of the check code is computed and entered into the check_code array, in step 605. When all eight commands have been entered into the pack_cmd array and the complete check code is computed, as determined in step 607, the index and sentent variables are initialized in step 6011, the check code is sent to the CPU in step 613 and a loop, steps 615, 617, 619, is entered to send the contents of the pack_cmd array to the CPU. Therefore, the spirit and scope of the appended claims should not be limited to the description of the preferred versions contained herein.

What is claimed is:

1. A fault tolerant graphics controller comprising:
an error code generator that receives graphics command codes, the error code generator configured to generate an error code for each graphics command code received;
a frame buffer for storing graphics data and graphics commands, including the error codes generated by the error code generator;
an error code decoder connected between the frame buffer and the graphics controller and configured to determine from a command code and its associated error code whether or not there is an error in the command code and to provide an indication thereof; and
a graphics controller for executing the graphics command codes to display the graphics data;
wherein the error code generator is a software module that is configured to store the received graphics commands into an array and to compute for each command a portion of an error code, such that, after a given number of commands is received, a check code for the given number of commands and the commands are available for processing by a CPU.

2. A fault tolerant graphics controller as recited in claim 1, wherein the given number of commands is eight and the check code has a size in bits and the commands have a size in bits that are equal.

3. A fault tolerant graphics controller as recited in claim 1,
wherein the error code generator receives data associated with graphics commands and is further configured to generate an error code for graphics data received; and
wherein the error code decoder is configured to determine from graphics data and its associated error code whether or not there is an error in the graphics data and to provide an indication thereof.

4. A fault tolerant graphics controller as recited in claim 1, wherein the error code decoder is configured to determine that a detected error in the command code is correctable and the decoder is further configured to correct the error in the command code.

5. A fault tolerant graphics controller as recited in claim 1, further comprising an interrupt and status controller, connected to the error code decoder, the interrupt and status controller configured to generate an interrupt or error status to a computer system hosting the graphics controller in response to the error indication from the error code decoder.

6. A fault tolerant graphics controller as recited in claim 1,
wherein the error indication from the error code decoder indicates that the error is uncorrectable; and
further comprising an interrupt and status controller connected to the error code decoder, the interrupt and status controller configured to generate an interrupt or error status to a computer hosting the graphics controller in response to the error indication when said indication indicates the error is uncorrectable.

7. A fault tolerant graphics controller as recited in claim 1, further comprising a flush-command controller connected to the error code decoder, the flush-command controller configured to flush command codes with errors from the graphics controller in response to the error indication.

8. A fault tolerant graphics controller as recited in claim 7, wherein the flush-command controller is configured to flush data associated with any erroneous command that is flushed.

9. A fault tolerant graphics controller as recited in claim 1,
wherein the error indication from the error code decoder indicates that the error is uncorrectable; and
further comprising a flush-command controller connected to the error code decoder, the flush-command controller configured to flush command codes with errors from the graphics controller in response to the error indication when said indication indicates the error is uncorrectable.

10. A fault tolerant graphics controller as recited in claim 9, wherein the flush-command controller is configured to flush data associated with any erroneous command that is flushed.

11. A fault tolerant graphics controller as recited in claim 1, further comprising a store-command controller connected to the error code decoder, the store-command controller configured to store command codes before and after the command code determined to have an error in response to the error indication.

12. A fault tolerant graphics controller as recited in claim 1,
wherein the error indication from the error code decoder indicates that the error is uncorrectable; and
further comprising a store-command controller connected to the error code decoder, the store-command controller configured to store command codes before and after the command code determined to have an error in response to the error indication when said indication indicates that the error is uncorrectable.

13. A fault tolerant graphics controller comprising:
an error code generator that receives graphics command codes, the error code generator configured to generate an error code for each graphics command code received;
a frame buffer for storing graphics data and graphics commands, including the error codes generated by the error code generator;
an error code decoder connected between the frame buffer and the graphics controller and configured to determine from a command code and its associated error code whether or not there is an error in the command code and to provide an indication thereof; and
a graphics controller for executing the graphics command codes to display the graphics data;
wherein the error code generator is configured to generate error codes, each 32 bits, for a group of eight graphics command codes, each 256 bits, and to combine the eight error codes together into a single 256 bit unit, for storage in the frame buffer along with the eight command codes.

14. A fault tolerant graphics controller as recited in claim 13, wherein the eight command codes and the combined eight error codes form a group of nine units of information, each 256 bits, to be stored as a unit in the frame buffer.

15. A fault tolerant graphics controller as recited in claim 14, wherein read and write pointers are included within the combined error code to provide demarcation of the individual error codes therein.

16. A method for processing graphics commands comprising:
receiving a graphics command code;
generating an error code for the graphics command code;
storing the graphics command code and its associated error code in a frame buffer configured to store graphics command codes and graphics data;
accessing the frame buffer for the graphics command code and obtaining its associated error code;
determining from the graphics command code and its associated error code whether there is an error in the graphics command code and providing an indication thereof;
executing the graphics commands to display the graphics data;
wherein a group of graphics command codes is received; and
wherein generating an error code for the graphics command code includes generating an error code for each command code in the group, and combining the error codes together into a single code word having the same size as any of the graphics command codes.

17. A method for processing graphics commands, as recited in claim 16, further comprising generating an interrupt or error status in response to an error indication.

18. A method for processing graphics commands, as recited in claim 16, further comprising generating an interrupt or error status in response to an error indication when said indication indicates that the error is uncorrectable.

19. A method for processing graphics commands, as recited in claim 16, further comprising preventing the execution of command codes in response to an error indication.

20. A method for processing graphics commands, as recited in claim 16, further comprising preventing the execution of command codes in response to an error indication when said indication indicates that the error is uncorrectable.

21. A method for processing graphics commands, as recited in claim 16, further comprising storing commands before and after a command having an erroneous code in response to an error indication.

22. A method for processing graphics commands, as recited in claim 16, further comprising storing commands before and after a command having an erroneous code in response to an error indication when said indication indicates that the error is uncorrectable.

23. A method for processing graphics commands, as recited in claim 16,
wherein the group includes eight graphics command codes, each 256 bits; and
wherein each error code is 32 bits and the combined error code is 256 bits.

* * * * *